United States Patent
Nakanishi et al.

(10) Patent No.: US 9,948,801 B2
(45) Date of Patent: *Apr. 17, 2018

(54) IMAGE FORMING APPARATUS

(71) Applicant: SHARP KABUSHIKI KAISHA, Sakai, Osaka (JP)

(72) Inventors: Kenji Nakanishi, Sakai (JP); Masahiro Imoto, Sakai (JP); Yasuhiro Suto, Sakai (JP); Shohichi Fukutome, Sakai (JP); Hisashi Yamanaka, Sakai (JP); Mitsuharu Yoshimoto, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,269

(22) Filed: Aug. 2, 2016

(65) Prior Publication Data

US 2016/0344883 A1 Nov. 24, 2016

Related U.S. Application Data

(60) Continuation of application No. 15/013,668, filed on Feb. 2, 2016, now Pat. No. 9,438,757, which is a
(Continued)

(30) Foreign Application Priority Data

Apr. 16, 2012 (JP) ................................. 2012-093122

(51) Int. Cl.
*G03G 15/00* (2006.01)
*B65H 31/00* (2006.01)
(Continued)

(52) U.S. Cl.
CPC ............ *H04N 1/0057* (2013.01); *B41J 29/13* (2013.01); *B65H 29/14* (2013.01); *B65H 29/52* (2013.01);
(Continued)

(58) Field of Classification Search
CPC . G03G 15/00; B41J 29/13; B65H 2301/5133; B65H 29/52; B65H 29/14;
(Continued)

(56) References Cited

U.S. PATENT DOCUMENTS 7,416,178 B2 8/2008 Ito
7,793,928 B2 9/2010 Ohama et al.
(Continued)

FOREIGN PATENT DOCUMENTS

JP 2003-146522 5/2003
JP 2003-324559 11/2003
(Continued)

OTHER PUBLICATIONS

International Search Report for PCT/JP2013/060488 dated May 14, 2013.
(Continued)

*Primary Examiner* — Nguyen Ha
(74) *Attorney, Agent, or Firm* — Nixon & Vanderhye P.C.

(57) ABSTRACT

An image forming apparatus includes an image reading unit, an image forming unit, a discharge unit, and a discharge tray. The image reading unit is configured to read a document placed on a document placement table by moving and scanning of a scanning body in a sub-scanning direction. The image forming unit is configured to form an image read by the image reading unit on a paper sheet. The discharge unit is configured to discharge the paper sheet on which an image is formed by the image forming unit to a direction perpendicular to the sub-scanning direction. The discharge tray is on which the paper sheet from the discharge unit is to be placed with a space portion at a lower side of the image reading unit. A bottom surface of a housing of the image reading unit facing the discharge tray is constituted of a first surface and a second surface. The first surface is a surface at
(Continued)

a front side of the discharge unit in a discharging direction and high with respect to the discharge tray. The second surface is a surface at a back side of the discharge unit in the discharging direction lower than the first surface with respect to the discharge tray. A pulling member and/or a movable wiring are/is arranged at an upper side of the second surface inside the housing. The pulling member is configured to move the scanning body back and forth in the sub-scanning direction. One end portion of the movable wiring is secured to the scanning body.

7 Claims, 9 Drawing Sheets

Related U.S. Application Data division of application No. 14/391,254, filed as application No. PCT/JP2013/060488 on Apr. 5, 2013, now Pat. No. 9,280,119.

(51) Int. Cl.

| | | |
|---|---|---|
| *H04N 1/00* | (2006.01) | |
| *B41J 29/13* | (2006.01) | |
| *B65H 29/14* | (2006.01) | |
| *B65H 29/52* | (2006.01) | |
| *H04N 1/10* | (2006.01) | |
| *G03G 21/16* | (2006.01) | |

(52) U.S. Cl.
CPC ............ *B65H 31/00* (2013.01); *G03G 15/00* (2013.01); *G03G 15/60* (2013.01); *G03G 15/6552* (2013.01); *G03G 21/1619* (2013.01); *H04N 1/0083* (2013.01); *H04N 1/00522* (2013.01); *H04N 1/00527* (2013.01); *H04N 1/00543* (2013.01); *H04N 1/00631* (2013.01); *H04N 1/00795* (2013.01); *H04N 1/1026* (2013.01); *B65H 2301/5133* (2013.01); *B65H 2405/115* (2013.01); *B65H 2801/06* (2013.01); *H04N 2201/0082* (2013.01)

(58) Field of Classification Search
CPC ................ B65H 31/00; B65H 2801/06; B65H 2405/115; B01N 1/00527; H04N 1/0083; H04N 1/00543
See application file for complete search history.

(56) References Cited

U.S. PATENT DOCUMENTS

| | | | |
|---|---|---|---|
| 7,912,418 B2 | 3/2011 | Hattori | |
| 7,971,873 B2 | 7/2011 | Ito | |
| 8,585,035 B2 | 11/2013 | Ohama et al. | |
| 9,067,748 B2 | 6/2015 | Ohama et al. | |
| 9,280,119 B2 | 3/2016 | Nakanishi | |
| 9,438,757 B2* | 9/2016 | Nakanishi | ................ B41J 29/13 |
| 2003/0081262 A1 | 5/2003 | Kawamura | |
| 2004/0247337 A1 | 12/2004 | Ohama | |
| 2004/0251608 A1 | 12/2004 | Saito | |
| 2005/0134929 A1 | 6/2005 | Kim | |
| 2007/0097393 A1 | 5/2007 | Suzuki | |
| 2007/0147923 A1 | 6/2007 | Uehara | |
| 2007/0177892 A1* | 8/2007 | Ikebata | .............. G03G 21/1628 399/107 |
| 2008/0175620 A1 | 7/2008 | Ohta et al. | |
| 2008/0180760 A1 | 7/2008 | Andoh et al. | |
| 2008/0180762 A1 | 7/2008 | Andoh et al. | |
| 2008/0181695 A1 | 7/2008 | Andoh et al. | |
| 2008/0181698 A1 | 7/2008 | Andoh et al. | |
| 2008/0291501 A1 | 11/2008 | Shiraki et al. | |
| 2008/0317498 A1 | 12/2008 | Andoh et al. | |
| 2009/0169281 A1 | 7/2009 | Oyama | |
| 2009/0201559 A1* | 8/2009 | Yamada | ............. H04N 1/00519 358/474 |
| 2010/0053678 A1 | 3/2010 | Yoshihisa et al. | |
| 2011/0006472 A1 | 1/2011 | Hirai et al. | |
| 2011/0198801 A1 | 8/2011 | Yamaguchi | |
| 2012/0235349 A1 | 9/2012 | Yamaguchi | |

FOREIGN PATENT DOCUMENTS

| | | |
|---|---|---|
| JP | 2004-118210 | 4/2004 |
| JP | 2005-053648 A | 3/2005 |
| JP | 2005-253013 A | 9/2005 |
| JP | 2006-001141 A | 1/2006 |
| JP | 2006-121721 | 5/2006 |
| JP | 2006-308681 | 11/2006 |
| JP | 2009-037188 | 2/2009 |
| JP | 2009-157238 | 7/2009 |
| JP | 2010-074625 A | 4/2010 |
| JP | 2011-184199 | 9/2011 |
| JP | 2012-123022 A | 6/2012 |

OTHER PUBLICATIONS

Office Action dated Mar. 21, 2016 in U.S. Appl. No. 15/013,668.
Notice of Allowance dated Jun. 2, 2016 in U.S. Appl. No. 15/013,668.
Office Action dated Jun. 25, 2015 in U.S. Appl. No. 14/391,254.
Notice of Allowance dated Oct. 21, 2015 in U.S. Appl. No. 14/391,254.

* cited by examiner

IMAGE FORMING APPARATUS

This application is a divisional of U.S. patent application Ser. No. 15/013,668, filed Feb. 2, 2016, which is a divisional of U.S. patent application Ser. No. 14/391,254, filed Oct. 8, 2014, which is the U.S. national phase of International Application No. PCT/JP2013/060488 filed 5 Apr. 2013 which designated the U.S. and claims priority to Japanese Patent Application No. 2012-093122 filed 16 Apr. 2012, the entire contents of each of which are hereby incorporated by reference.

TECHNICAL FIELD

The present invention relates to an image forming apparatus of an in-body paper discharging type, more specifically, relates to an image forming apparatus with a structure where a paper sheet on which an image has been formed by an image forming unit is discharged in a direction perpendicular to a sub-scanning direction, a movement direction of a scanning body.

BACKGROUND ART

Recently, demands of space-saving, downsizing, and thinning of an image forming apparatus have been further increased. In response to these demands, it is possible to thin an image forming apparatus of an in-body paper discharging type that includes a discharge tray between an image reading unit (a scanner unit) and an image forming unit by narrowing down its sheet discharge space. However, narrowing down the sheet discharge space causes a problem that a paper sheet is difficult to be extracted.

In particular, assume that a surface of an apparatus main body facing a user standing position is a front surface side. With the image forming apparatus with an in-body paper discharge structure where a sheet discharge space opens to the front surface side of the apparatus main body and a paper sheet is discharged from a back surface side (a back side) to the front surface side (the front side) of the apparatus main body, only a distal end part of the paper sheet to be discharged is seen from the opening of the sheet discharge space. Accordingly, there is a problem that narrowing the sheet discharge space making the extraction of the paper sheet more difficult.

Therefore, image forming apparatuses disclosed in Patent Literatures 1 and 2 are provided as one method for solving this problem.

The image forming apparatus disclosed in Patent Literature 1 is an image forming apparatus of the in-body paper discharging type with an opening for a sheet discharge space at a front side. As illustrated in FIG. 2 of Patent Literature 1, a recording paper creating unit (an image forming unit) is arranged so as to project to the front side with respect to an image reading unit (a scanner unit). Moreover, a lower surface at the front side of the image reading unit is formed to an inclined surface inclining so as to expand toward the opening.

Similarly, the image forming apparatus disclosed in Patent Literature 2 is an image forming apparatus of the in-body paper discharging type with an opening for a sheet discharge space at a front side. As illustrated in FIG. 3 of Patent Literature 2, the image forming apparatus includes an inclined portion (or a step) between a lower-surface-front-portion supporting unit, which is a top board, and a lower-surface-rear-portion supporting unit (a lower projecting portion supporting unit) that support an image reading unit (an image scanner). The image forming apparatus where the lower-surface-front-portion supporting unit is formed at a higher position than the lower-surface-rear-portion supporting unit using this inclined portion (or the step) is disclosed.

CITATION LIST

Patent Literature

PATENT LITERATURE 1: Japanese Unexamined Patent Application Publication No. 2004-118210
PATENT LITERATURE 2: Japanese Unexamined Patent Application Publication No. 2006-121721

SUMMARY OF INVENTION

Technical Problem

However, the image forming apparatus of Patent Literature 1 has a structure that discharges a paper sheet from a front surface side (an opening side) of an apparatus main body to a back surface side (a back side) of the apparatus main body. Accordingly, regardless of a paper sheet size, a rear end portion of the discharged paper sheet always positions at the opening, which is at the front side. Therefore, it can be said that the paper sheet can be easily extracted even if the lower surface at the front side of an image reading unit is not formed at an inclined surface. With the image forming apparatus of Patent Literature 1, since a recording paper creating unit (an image forming unit) is arranged so as to project to the front side with respect to an image reading unit (a scanner unit), resulting in going against downsizing of the apparatus.

The image forming apparatus of Patent Literature 2 has a structure that discharges a paper sheet from a right side at a front surface of an apparatus main body to a left side at the front surface of the apparatus main body (that is, parallel along an inclined portion and a step). Accordingly, regardless of a paper sheet size, the entire side end portion of the discharged paper sheet always positions at an opening. In this meaning, it can be said that the paper sheet can be easily extracted comparatively even if a lower surface at the front side of an image reading unit is not formed at the inclined portion and the step.

On the other hand, with an image forming apparatus with an in-body paper discharge structure where a sheet discharge space opens to a front surface side of an apparatus main body and that discharges a paper sheet from a back surface side (a back side) to a front surface side (a front side) of the apparatus main body, even if the inclined surface and the step disclosed in Patent Literatures 1 and 2 are disposed, only the distal end part of the paper sheet to be discharged is seen from the opening for the sheet discharge space. This does not sufficiently solve the problem of difficulty in the extraction of the paper sheet. In particular, in the case of a small-sized paper, such as a postcard, the distal end portion of the paper sheet positions at the back side farther than the inclined surface. Accordingly, it cannot be said that the problem of difficulty in the extraction of the paper sheet is sufficiently solved only by disposing the inclined surface and the step.

On the other hand, as another method for expanding a discharge space, thinning the image reading unit is considered. However, in the case where a scanning body (a scanner body) and a circuit board inside of the apparatus main body are coupled with a movable wiring cable (a flat cable), a thickness of the image reading unit needs to be secured by at least a thickness of the wiring cable in a width direction. Additionally, a position at which a pulling member for moving the scanning body back and forth in a sub-scanning direction is arranged needs to be secured. Accordingly, this wiring cable and pulling member become a problem for thinning the image reading unit.

The present invention has been made to solve these problems, and its object is to provide an image forming apparatus with an in-body paper discharge structure where a sheet discharge space opens to a front surface side of an apparatus main body and that discharges a paper sheet from the back surface side (the back side) to the front surface side (the front side) of the apparatus main body. The image forming apparatus achieves easily extracting the paper sheet discharged on a discharge tray by expanding the sheet discharge space (that is, a height direction is heighten), being unaffected by an influence of the wiring cable and the pulling member.

Solutions to the Problems

To solve the above-described problems, an image forming apparatus of the present invention is an image forming apparatus that includes an image reading section, an image forming section, a discharge section, and a discharge tray. The image reading section is configured to read a document placed on a document placement table by moving and scanning of a scanning body in a sub-scanning direction. The image forming section is configured to form an image read by the image reading section on a paper sheet. The discharge section is configured to discharge the paper sheet on which an image is formed by the image forming section to a direction perpendicular to the sub-scanning direction. The discharge tray is on which the paper sheet from the discharge section is to be placed with a space section at a lower side of the image reading section. A bottom surface of a housing of the image reading section facing the discharge tray is constituted of a first surface and a second surface. The first surface is a surface at a front side of the discharge section in a discharging direction and high with respect to the discharge tray. The second surface is a surface at a back side of the discharge section in the discharging direction lower than the first surface with respect to the discharge tray. A pulling member and/or a movable wiring are/is arranged at an upper side of the second surface inside the housing. The pulling member is configured to move the scanning body back and forth in the sub-scanning direction. One end portion of the movable wiring is secured to the scanning body. More specifically, the bottom surface of the housing is segmented into the first surface and the second surface with a stepped section formed along the sub-scanning direction.

With the above-described configuration, the pulling member (a belt, a pulley, or a similar component) and the movable wiring (a flat cable or a similar cable) are arranged inside the housing at the upper side of the second surface. Therefore, a height of the first surface, which is a bottom surface of the image reading section, from the discharge tray can be raised up to a height restricted by the scanning body. Further, by raising the bottom of the first surface, the discharge space on the discharge tray is expanded particularly in the height direction. Accordingly, even if a small-sized paper sheet is discharged on the discharge tray, the paper sheet discharged to the back side of the discharge tray (the discharge section side) can be easily taken out. Additionally, the apparatus itself can be downsized.

In the image forming apparatus of the present invention, the discharge section may be arranged at a lower side of the first surface or a lower side of the second surface. More specifically, the discharge section may be arranged close to the stepped section.

In the image forming apparatus of the present invention, the first surface may include a plurality of rib pieces. The plurality of rib pieces extend in a paper discharging direction perpendicular to the sub-scanning direction.

Thus, by disposing the plurality of rib pieces at the first surface, even if the paper sheet discharged from the discharge section abuts on the first surface and is worn down, the paper sheet abuts on the rib pieces before abutting on the first surface, allowing reducing a rub sound. Disposing the rib pieces allows preventing a paper jam caused by the distal end of the paper sheets discharged from the discharge section abutting on and being got caught on the first surface. This also can prevent the discharged paper sheets from being irregularly loaded on the discharge tray.

In the image forming apparatus of the present invention, a projection projecting inward of the housing section may be disposed along the sub-scanning direction. The projection is disposed at an end portion of the first surface close to the discharge section. With this configuration, by disposing the projection at the end portion close to the discharge section on the first surface, the strength of the bottom surface of the housing for the image reading section can be enhanced.

In the image forming apparatus of the present invention, the projection may be disposed at the stepped section. With this configuration, disposing the projection at the stepped section allows enhancing the strength of the bottom surface of the housing for the image reading section.

In the image forming apparatus of the present invention, the projection is a guiding section configured to guide the scanning body in the sub-scanning direction. At a bottom surface of the scanning body, a guided section may be disposed to be guided by the guiding section to move back and forth in the sub-scanning direction. With this configuration, the use of the projection as the guiding section allows doubling two functions as a function for preventing a deterioration of a strength of the housing and a guiding function of the scanning body.

In the image forming apparatus of the present invention, the guided section may be a concaved groove section formed along the sub-scanning direction engaging with and slidably in contact with the projection. The simple engaging structure, the projection and the concaved groove section, allows smoothly guiding the scanning body.

In the image forming apparatus of the present invention, the projection is a concaved groove section where a bottom surface side of the housing is concaved upward along the sub-scanning direction. The concaved groove section may include a static eliminating brush. With this configuration, disposing the static eliminating brush at the concaved groove section allows reliably eliminating static electricity on the paper sheet discharged from the discharge section.

Advantageous Effects of Invention

According to the present invention, the pulling member and the movable wiring are arranged inside the housing at the upper side of the second surface. Therefore, a height of the first surface, which is a bottom surface of the image reading unit, from the discharge tray can be raised up to a height restricted by the scanning body. Further, by raising the bottom of the first surface, the discharge space on the discharge tray can be expanded in the height direction. Accordingly, even if a small-sized paper sheet is discharged on the discharge tray, the paper sheet discharged to the back side of the discharge tray (the discharge unit side) can be easily taken out. Additionally, the apparatus itself can be downsized (in particular, thinned).

DESCRIPTION OF EMBODIMENTS

Embodiments of the present invention will be described below by referring to the accompanying drawings.

Figure 1:
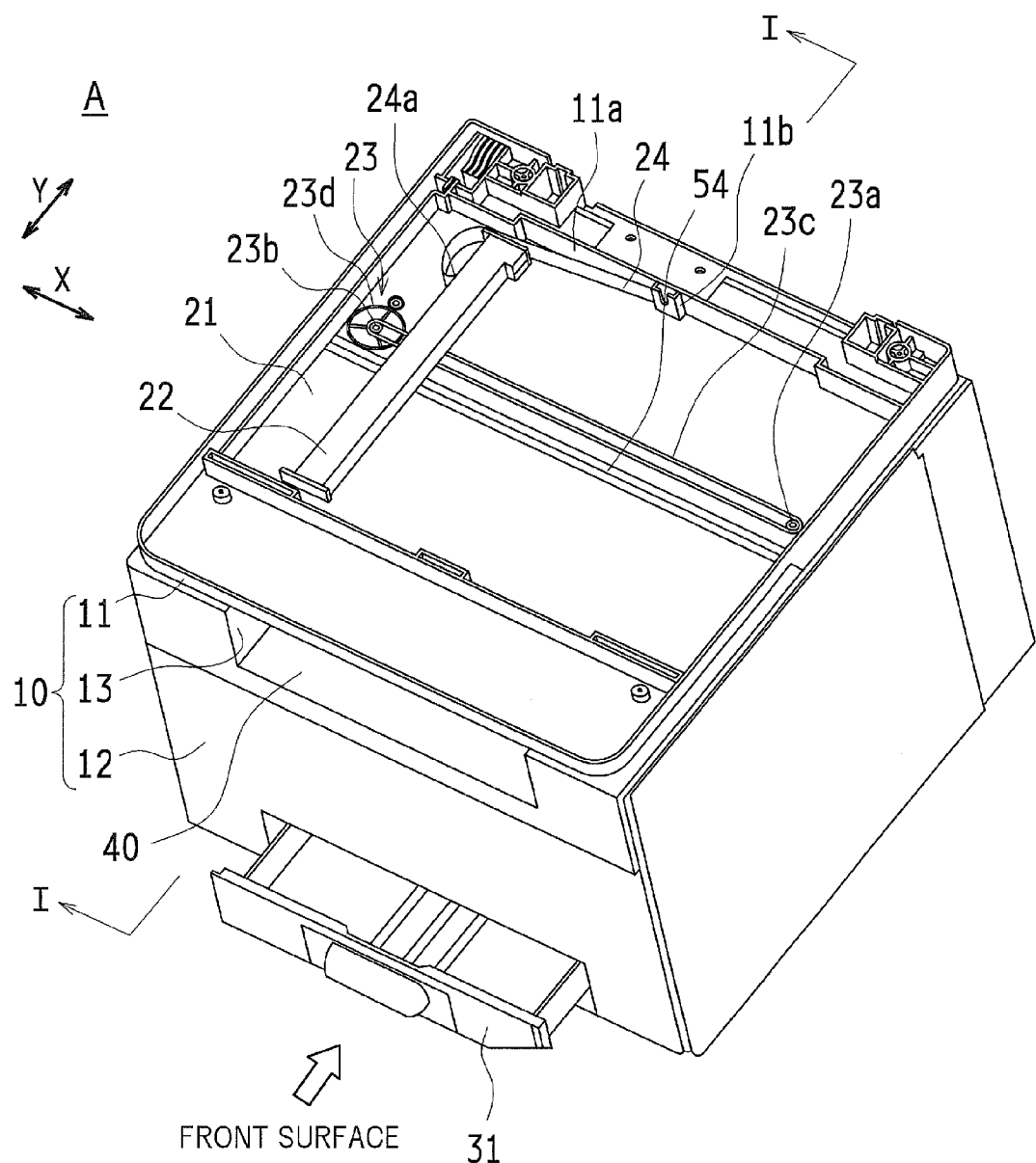
FIG. 1 is a perspective view of an image forming apparatus of the present invention.
Figure 2:
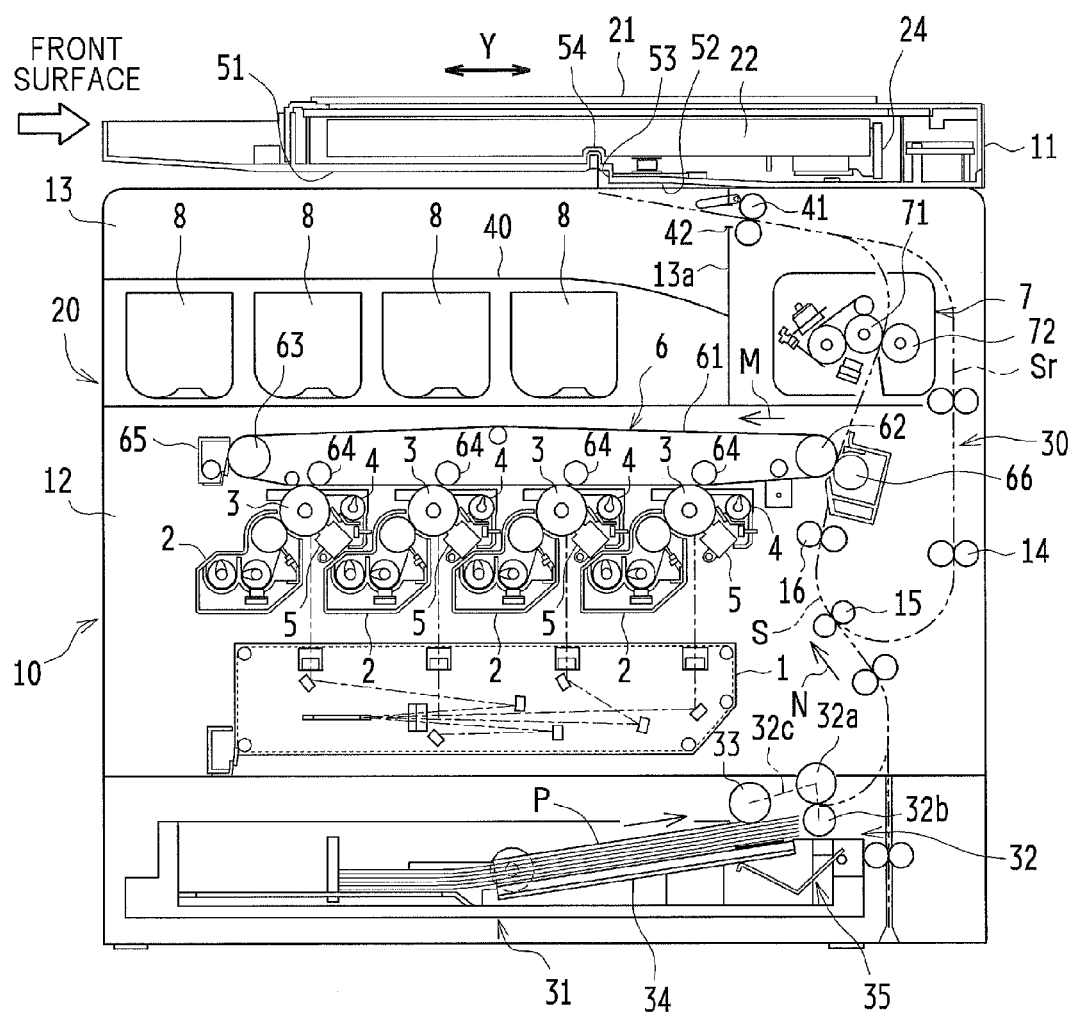
FIG. 2 is a schematic cross-sectional view of when the image forming apparatus of the present invention is viewed from a side surface and a schematic cross-sectional view taken along the line I-I of FIG. 1.
Figure 3A:
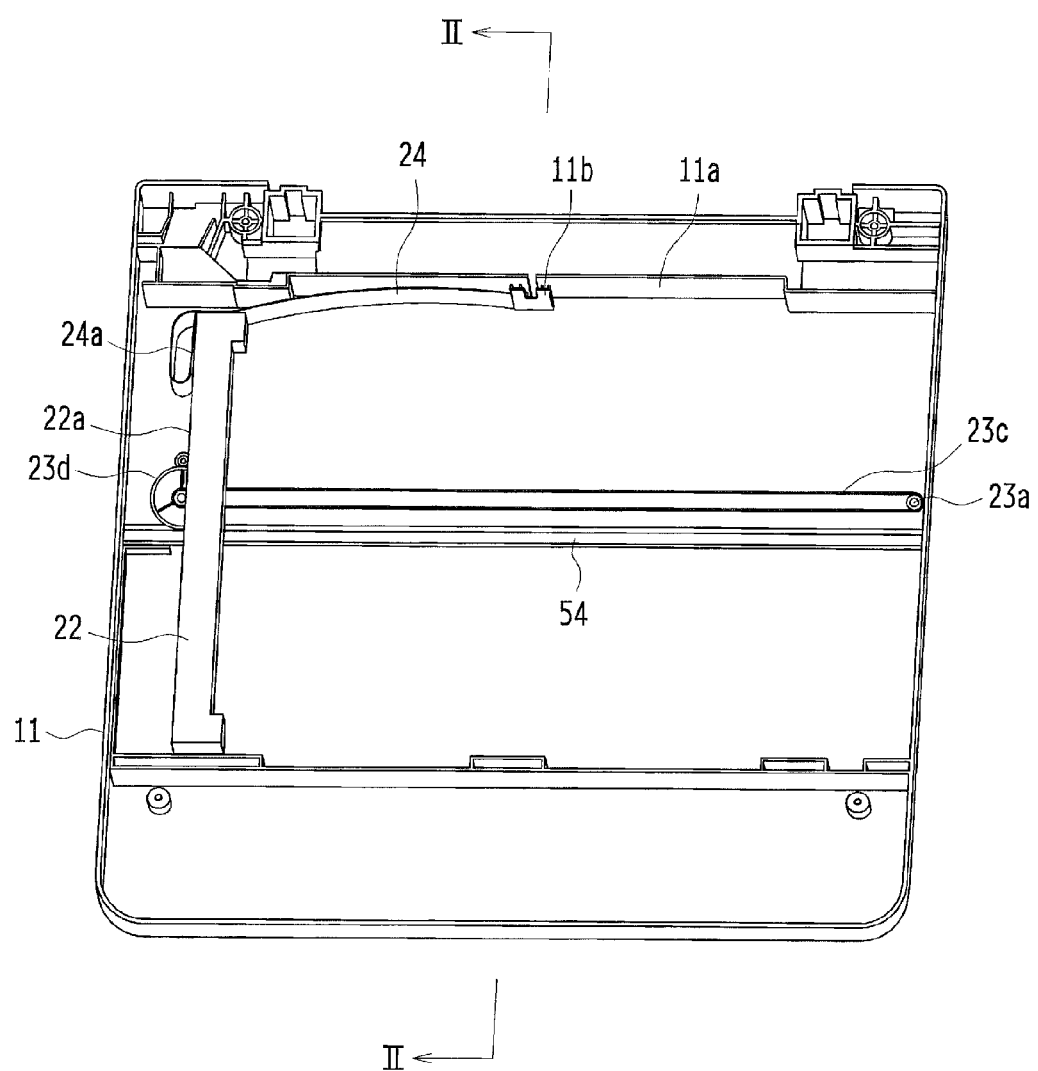
FIG. 3A is a perspective view of an image capturing housing unit.
Figure 3B:
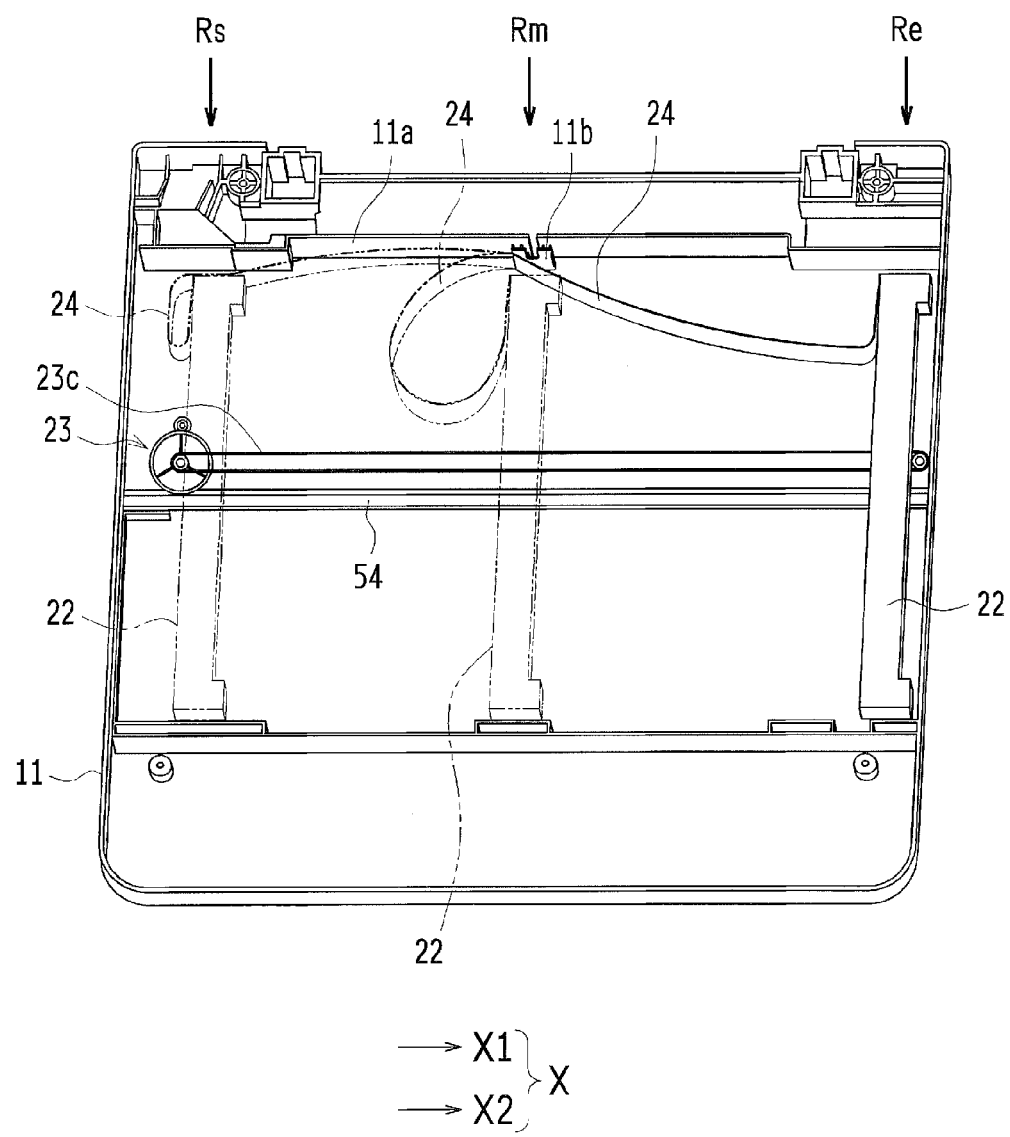
FIG. 3B is a perspective view of the image capturing housing unit.

FIG. 1 is a perspective view of an image forming apparatus of the present invention. FIG. 2 is a schematic cross-sectional view of when the image forming apparatus of the present invention is viewed from a side surface (a schematic cross-sectional view taken along the line I-I of FIG. 1). FIG. 3A and FIG. 3B are perspective views of an image capturing housing unit. Note that, in the embodiment, the illustration of an original reading apparatus that reads documents in automatic feeding is omitted.

An image forming apparatus A illustrated in FIG. 1 and FIG. 2 is an image forming apparatus of an in-body paper discharging type. The image forming apparatus A includes an in-body paper discharge space portion 13 between an image capturing housing unit 11 and an image forming housing unit 12 of an apparatus main body 10. The in-body paper discharge space portion 13 has a U shape in a cross section. Assume that an opposed surface of the apparatus main body 10 facing a user standing position as a front surface side. The in-body paper discharge space portion 13 is open to the front surface side of the apparatus main body 10. The image forming apparatus A has a structure that discharges a paper sheet from a back surface side (a back side) to the front surface side (a front side) of the apparatus main body 10 (a Y direction in the drawing). A paper feed tray 31 also has a structure of being extracted from the front surface side of the apparatus main body 10 in the Y direction.

A document placement table glass 21 on which the document is placed is disposed at the top of the image capturing housing unit 11. The document placement table glass 21 is made of a transparent glass. A scanning body (an optical unit) 22, a pulling member 23, and a movable wiring 24 are disposed at the inside of the image capturing housing unit 11 at the lower portion of the document placement table glass 21. The scanning body 22 reads the documents. The pulling member 23 moves the scanning body 22 back and forth in a sub-scanning direction X (that is, a direction perpendicular to a paper discharging direction Y). One end portion of the movable wiring 24 is coupled to and secured to the scanning body 22. The other end portion of the movable wiring 24 is coupled to and secured to a circuit board (not illustrated) disposed inside of the apparatus main body 10. The entire movable wiring 24 formed of a flat cable or a similar cable is flexibly disposed. That is, the image forming apparatus A according to the embodiment is arranged such that a scanning direction X of the scanning body 22 is perpendicular to the paper discharging direction Y.

The pulling member 23 includes an idler pulley 23a, a drive pulley 23b, and an endless belt 23c. The idler pulley 23a and the drive pulley 23b are arranged adjacent to both end portions in the sub-scanning direction X. The belt 23c is bridged across these pulleys 23a and 23b. The scanning body 22 is secured to the belt 23c. The drive pulley 23b coordinates with a driving motor (not illustrated) via a pulley gear 23d or a similar gear. However, since this constitution of the pulling member 23 is a conventionally known constitution, the detailed description will not be further elaborated here. Since various well-known conventional constitution is also applicable to the constitution of the scanning body 22 (an integrally combined structure of an optical unit and a unit case that houses the optical unit or a similar unit), the detailed description of such combined structure will not be further elaborated here.

As illustrated in FIG. 1, FIG. 3A, and FIG. 3B, a slit portion 11b for extracting a cable is formed at approximately center of a sidewall 11a at a back surface side (a back side) inside of the image capturing housing unit 11 in the sub-scanning direction X. The movable wiring (hereinafter referred to as the movable wiring cable) 24 whose other end portion is coupled to the circuit board (not illustrated) is guided to the lateral direction such that a flat surface of the movable wiring cable 24 stands vertically from the slit portion 11b. The guided movable wiring cable 24, as illustrated in FIG. 1 and FIG. 3A, is extended to a back surface 22a side via an end portion of the scanning body 22, and then is folded back to a U shape at the back surface 22a side. A folded-back distal end portion 24a is secured to the end portion of the back surface 22a and is electrically connected to an internal optical unit (CIS: Contact Image Sensor) (not illustrated).

The movable wiring cable 24 thus wired, as a deformation process of the movable wiring cable 24 illustrated in FIG. 3B, when the scanning body 22 is at a scanning start position Rs, the movable wiring cable 24 extends almost in a straight line excluding a secured portion of the folded-back distal end portion 24a. When the scanning body 22 moves from the scanning start position Rs in a scanning direction X1 and reaches around the center portion (a position denoted by Rm in FIG. 3B), the movable wiring cable 24 is deformed to a loop shape drawing a large ring. Further, when the scanning body 22 moves in the scanning direction X1 and reaches a scanning end position Re, the movable wiring cable 24 excluding the secured part of the folded-back distal end portion 24a deforms so as to extend in a gentle curve shape. When the scanning body 22 ends the scanning and returns to the scanning start position Rs in a scanning direction X2, the movable wiring cable 24 experiences a deformation process reverse to the above-described process.

The image forming apparatus A thus constituted is a color image forming apparatus that forms multi-color and single-color images on a sheet such as a recording paper sheet (hereinafter referred to as a paper sheet) P according to image data transmitted from the outside. The apparatus main body 10 includes an original reading apparatus (not illustrated) at the upper portion. The image forming housing unit 12 includes an image forming unit 20 and a paper sheet conveyance system 30.

The image forming unit 20 includes an exposure unit 1, a plurality of developing units 2, a plurality of photosensitive drums 3, a plurality of cleaning units 4, a plurality of charging units 5, an intermediate transfer belt unit 6, a fixing unit 7, and a plurality of toner cartridge units 8.

The paper sheet conveyance system 30 includes a paper sheet conveyance passage S, the paper feed tray 31, a paper feeder 32, and a discharge tray 40. The paper feed tray 31 houses a paper sheet P. The paper feeder 32 supplies the paper sheet P housed in the paper feed tray 31 to the paper sheet conveyance passage S.

The discharge tray 40 is disposed upward of the image forming unit 20 of the apparatus main body 10. The discharge tray 40 accumulates the image-formed (printed) paper sheet P in a facedown manner.

The paper feeder 32 has a constitution that supplies the paper sheet P to be housed in the paper feed tray 31 to the paper sheet conveyance passage S. The paper feeder 32 includes a feed roller 33, a separation conveyance roller 32$a$, a separating member 32$b$, an elevation drive unit (not illustrated), and a sheet supply drive unit (not illustrated). The elevation drive unit drivingly moves up and down a rotating plate 34 at the paper feed tray 31 with an elevating mechanism unit 35. The sheet supply drive unit rotatably drives the separation conveyance roller 32$a$ and the feed roller 33.

The image forming apparatus A handles image data corresponding to color images using a plurality of colors (here, respective colors of black (K), cyan (C), magenta (M), and yellow (Y)). Accordingly, the plurality of respective developing units 2, photosensitive drums 3, cleaning units 4, charging units 5, and toner cartridge units 8 are set (here, four units of black, cyan, magenta, and yellow are provided for each) to form a plurality of kinds (here, four kinds) of images corresponding to the respective colors. These units constitute a plurality of image stations (here, four stations).

The exposure unit 1 is constituted as a laser scanning unit (LSU) with a laser emitting portion and a reflective mirror. The exposure unit 1 exposes the respective charged photosensitive drums 3 corresponding to input image data. This forms electrostatic latent images corresponding to the image data on surfaces of the respective photosensitive drums 3.

The toner cartridge unit 8 is a unit that houses toner, and supplies the toner to a developer tank of the developing unit 2.

The developing unit 2 uses four colors (Y, M, C, and K) of toners to visualize the electrostatic latent images formed on respective photosensitive drums 3. The cleaning unit 4 removes and recovers the toner remaining on the surface of the photosensitive drum 3 after development and transfer of the image. The charging unit 5 uniformly charges the surface of the photosensitive drum 3 at a predetermined electric potential.

The intermediate transfer belt unit 6 arranged above the photosensitive drum 3 includes an intermediate transfer belt 61, an intermediate transfer belt drive roller 62, an intermediate transfer belt driven roller 63, a plurality of intermediate transfer rollers 64, and an intermediate transfer belt cleaning unit 65. The intermediate transfer belt 61 acts as an intermediate transfer body.

Four of the intermediate transfer rollers 64 are disposed corresponding to the respective colors of Y, M, C, and K. The intermediate transfer belt drive roller 62 stretches the intermediate transfer belt 61 and is rotatably driven along with the intermediate transfer belt driven roller 63 and the intermediate transfer roller 64 to move the intermediate transfer belt 61 around in a movement direction (a direction of an arrow M in FIG. 2).

The toner images with respective colors formed on the respective photosensitive drums 3 are sequentially transferred to be overlaid on the intermediate transfer belt 61. This forms a color toner image (a multi-color toner image) on the surface of the intermediate transfer belt 61.

The toner image is transferred from the photosensitive drum 3 to the intermediate transfer belt 61 by the intermediate transfer roller 64 in contact with a back side of the intermediate transfer belt 61.

As described above, the toner images are visualized on the respective photosensitive drums 3 corresponding to the respective hues, and laminated on the intermediate transfer belt 61. The toner images laminated on the intermediate transfer belt 61 are moved by rotation of the intermediate transfer belt 61. The toner images are then transferred on the paper sheet P with a transfer roller 66. The transfer roller 66 is arranged at a position at which the paper sheet P is in contact with the intermediate transfer belt 61.

The intermediate transfer belt cleaning unit 65 removes and recovers the toner remaining on the intermediate transfer belt 61.

The apparatus main body 10 includes the S-shaped paper sheet conveyance passage S. The paper sheet conveyance passage S transmits the paper sheet P on the paper feed tray 31 to the discharge tray 40 via the image forming unit 20. Along the paper sheet conveyance passage S, respective conveyance members such as a conveyance roller pair 14, a prior-to-registration roller pair 15, a registration roller pair 16, a hot roller 71 and a pressure roller 72 in the fixing unit 7, and a discharge roller pair 41 are arranged.

The fixing unit 7 is arranged in the apparatus main body 10 at a back surface 13$a$ side of the in-body paper discharge space portion 13 formed into a U shape in cross section. The fixing unit 7 receives the paper sheet P on which the toner image has been transferred and sandwiches the received paper sheet P between the hot roller 71 and the pressure roller 72 for conveyance. The discharge roller pair 41 arranged adjacent to the back surface 13$a$ of the in-body paper discharge space portion 13 discharges the paper sheet P after fixation of the toner images with respective colors from a paper sheet discharge port (a discharge unit) 42 formed at the back surface 13$a$ of the in-body paper discharge space portion 13 on the discharge tray 40 in the paper discharging direction Y.

In the case where not only a front surface of the paper sheet P but duplex image formation is performed, after the fixing unit 7 fixes the image on the front surface of the paper sheet P, in the process of the paper sheet P being conveyed by the discharge roller pair 41 in the paper sheet conveyance passage S, the discharge roller pair 41 is stopped and inversely rotated. Next, the paper sheet P is passed through to a front-back reverse path Sr, the front and back of the paper sheet P is reversed, and the paper sheet P is again guided to an upstream side with respect to the registration roller pair 16 in a supply direction N (in this example, the upstream side of the prior-to-registration roller pair 15). Then, similar to the front surface of the paper sheet P, an image is recorded and fixed on the back surface of the paper sheet P, and finally the paper sheet P is discharged to the discharge tray 40.

The overall constitution of the image forming apparatus A is described above.

Figure 4:
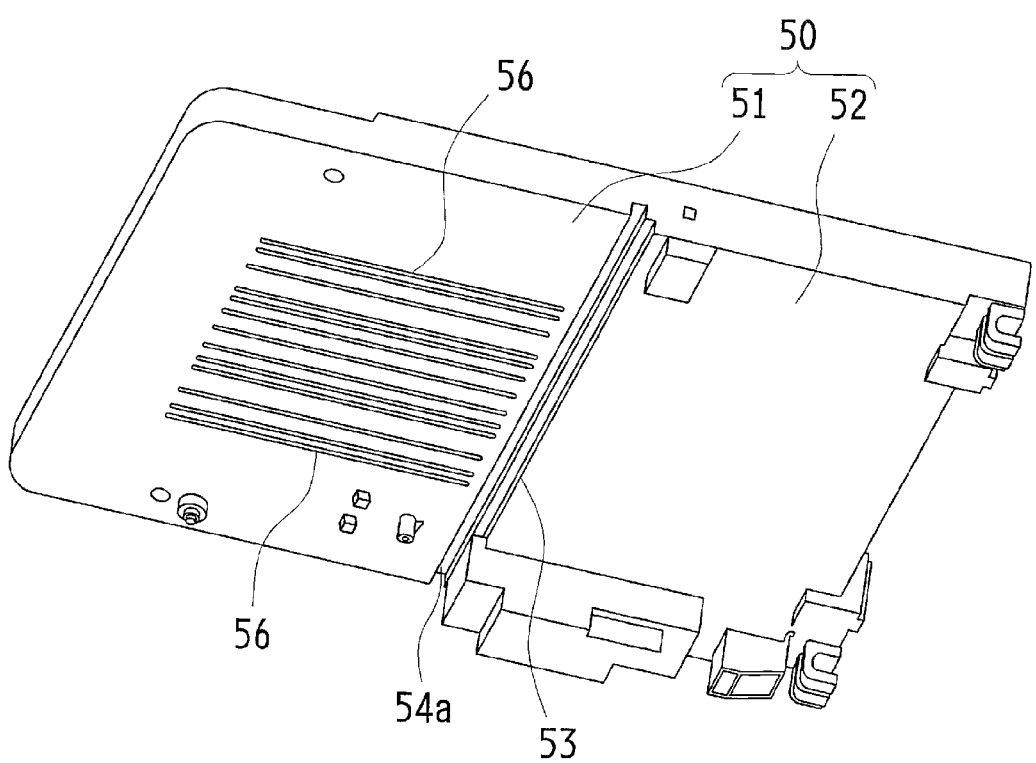
FIG. 4 is a perspective view of when the image capturing housing unit is viewed from a bottom surface side.
Figure 5:
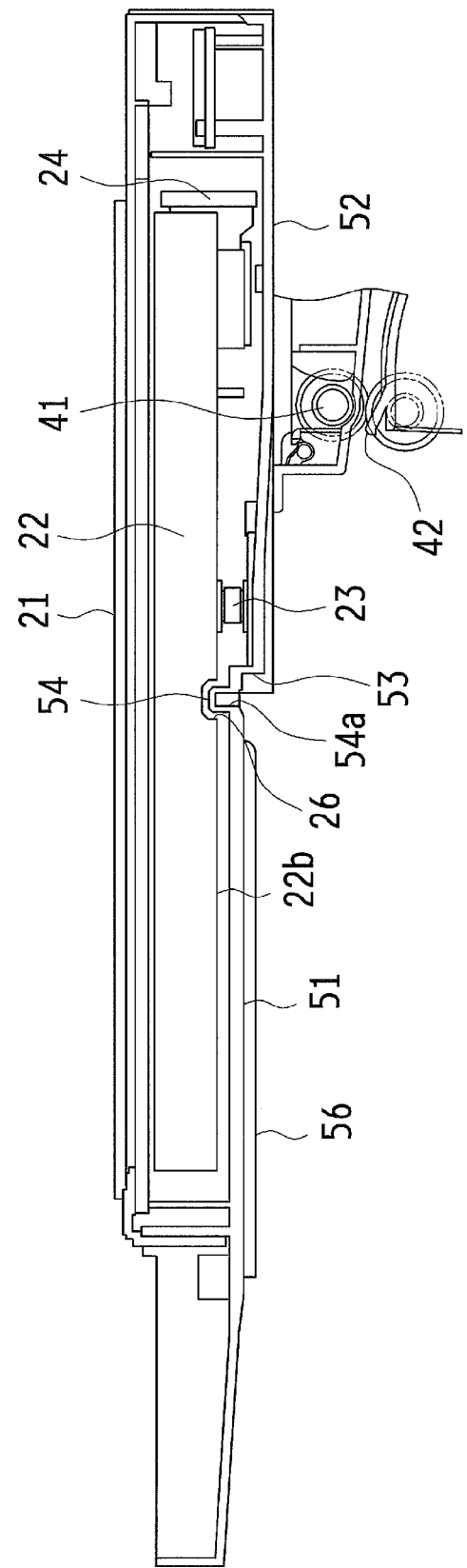
FIG. 5 is a cross-sectional view taken along the line II-II of FIG. 3A.
Figure 6:
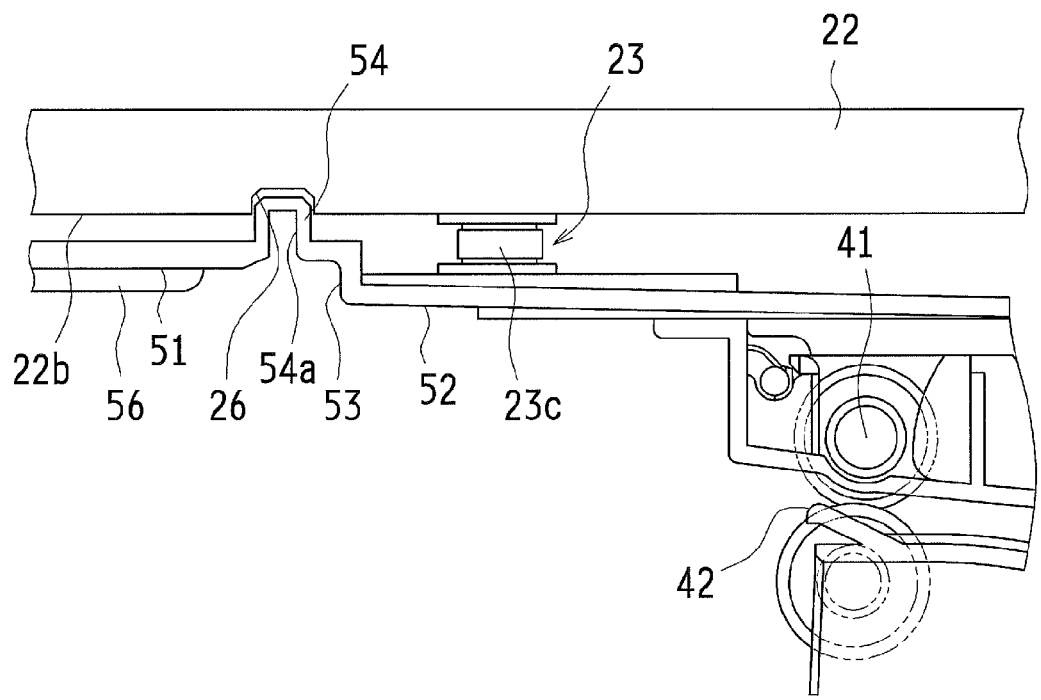
FIG. 6 is an enlarged cross-sectional view of a main part of FIG. 5.

The following describes the constitution of the image capturing housing unit 11, which is a feature of the present invention, with reference to FIG. 1 to FIG. 6. Note that FIG. 4 is a perspective view of when the image capturing housing unit 11 is viewed from a bottom surface side, FIG. 5 is a cross-sectional view taken along the line II-II of FIG. 3A, and FIG. 6 is an enlarged cross-sectional view of a main part of FIG. 5.

In the image forming apparatus A of the present invention, a bottom surface 50 of the image capturing housing unit 11 opposed to the discharge tray 40 is configured as follows. At the front side of the discharge tray 40 in the discharging direction the bottom surface 50 of the image capturing housing unit 11 is configured as a first surface higher than the discharge tray 40. At the rear side of the discharge tray 40 in the discharging direction the surface of the bottom surface 50 is configured as a second surface lower than the first surface with respect to the discharge tray 40.

More specifically, the image capturing housing unit 11 of this embodiment is constituted as follows. The bottom surface 50 (see FIG. 4) facing the discharge tray 40 is segmented into a first surface 51 and a second surface 52 with a stepped portion 53 formed along the sub-scanning direction X. The first surface 51 at the front side of the paper sheet discharge port 42, which is a discharge unit, in the discharging direction (namely, the front surface side of the apparatus main body 10) is arranged so as to be disposed at a higher position than the second surface 52 at the read side of the paper sheet discharge port 42, which is a discharge unit, in the discharging direction (namely, the back surface side of the apparatus main body 10) with respect to the discharge tray 40. That is, the first surface 51 is arranged away from the discharge tray 40 more than the second surface 52. The paper sheet discharge port 42 (namely, the discharge roller pair 41) is arranged at the lower side of the second surface 52 and adjacent to the stepped portion 53 (namely, close to the stepped portion 53).

Then, according to the embodiment, the pulling member 23 and the movable wiring cable (the flat cable or a similar cable) 24 are arranged at the upper side of the second surface 52 in the image capturing housing unit 11. The pulling member 23 moves the scanning body 22 back and forth in the sub-scanning direction X.

According to this constitution, it is only necessary that only the scanning body 22 be disposed at the upper side of the first surface 51 inside of the image capturing housing unit 11. Therefore, a height of the first surface 51, which is a bottom surface of the image capturing housing unit 11, from the discharge tray 40 can be raised up to a height restricted by the scanning body 22. By raising the bottom of the first surface 51, the in-body paper discharge space portion 13 on the discharge tray 40 is expanded particularly in the height direction. Accordingly, even if a small-sized paper sheet is discharged on the discharge tray 40, the paper sheet discharged to the back side of the discharge tray 40 (the back surface 13a of the in-body paper discharge space portion 13) can be easily taken out. Additionally, the apparatus itself can be downsized.

With the image forming apparatus A of this embodiment, the projection 54 projecting inward of the image capturing housing unit 11 is disposed along the sub-scanning direction X. The projection 54 is disposed at an end portion of the first surface 51 close to the paper sheet discharge port 42. Thus, the first surface 51 includes the projection 54 at the end portion close to the paper sheet discharge port 42. This allows further improving a strength of the bottom surface of the image capturing housing unit 11.

The projection 54 also serves as a guiding portion that guides the scanning body 22 in the sub-scanning direction X. Accordingly, a guided portion 26 is disposed at a bottom surface (more specifically, the bottom surface of the unit case housing the optical unit) 22b approximately center portion of the scanning body 22 in the width direction (the paper discharging direction Y). The projection 54, which is a guiding portion, guides the guided portion 26 to move the guided portion 26 back and forth in the sub-scanning direction X. In this embodiment, this guided portion 26 is a concaved groove unit formed slidably in contact with the projection 54 so as to be fitted to and engaged with the projection 54 along the sub-scanning direction X. With this configuration, the use of the projection 54 as the guiding portion doubles two functions as a function for preventing a deterioration of a strength of the image capturing housing unit 11 and a guiding function of the scanning body 22. The simple engaging structure, the projection and the concaved groove portion, allows smoothly guiding the scanning body 22.

In this embodiment, a plurality of rib pieces 56 (see FIG. 4) are disposed at the first surface 51. The plurality of rib pieces 56 extend in the paper discharging direction Y, which is perpendicular to the sub-scanning direction X. As shown in FIG. 4, the plurality of rib pieces are formed at different intervals.

Thus, by disposing the plurality of rib pieces 56 at the first surface 51, even if the paper sheet discharged from the paper sheet discharge port 42 abuts on the first surface 51 and is worn down, the paper sheet abuts on the rib pieces 56 before abutting on the first surface 51, allowing reducing a rub sound. Disposing the rib pieces 56 allows preventing the discharged paper sheets from being irregularly loaded on the discharge tray caused by the distal end of the paper sheets discharged from the paper sheet discharge port 42 abutting on and being got caught on the first surface 51. This also can prevent a paper jam or a similar problem caused by the distal end of the paper sheets abutting on the first surface 51.

Figure 7:
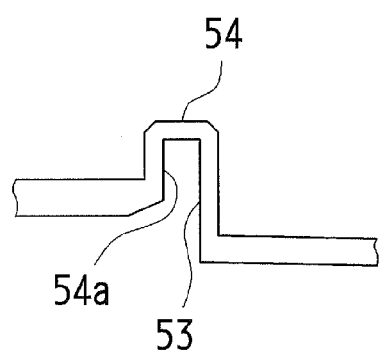
FIG. 7 is an enlarged cross-sectional view of a main part illustrating another example of a formation position of a projection.

FIG. 7 illustrates another example of a formation position of the projection 54. That is, in the above-described example, even if the stepped portion 53 and the projection 54 are arranged closely, the respective stepped portion 53 and projection 54 are individually formed. However, in the example of FIG. 6, the stepped portion 53 is run so as to directly project to the inside of the image capturing housing unit 11, and then is folded back downward in a U shape in cross section, thus the projection 54 is formed. That is, the stepped portion 53 is used as one sidewall of the projection 54. With this configuration, disposing the projection 54 at the stepped portion 53 (that is, integrally forming the projection 54 and the stepped portion 53), the strength of the bottom surface of the image capturing housing unit 11 can be enhanced.

Figure 8:
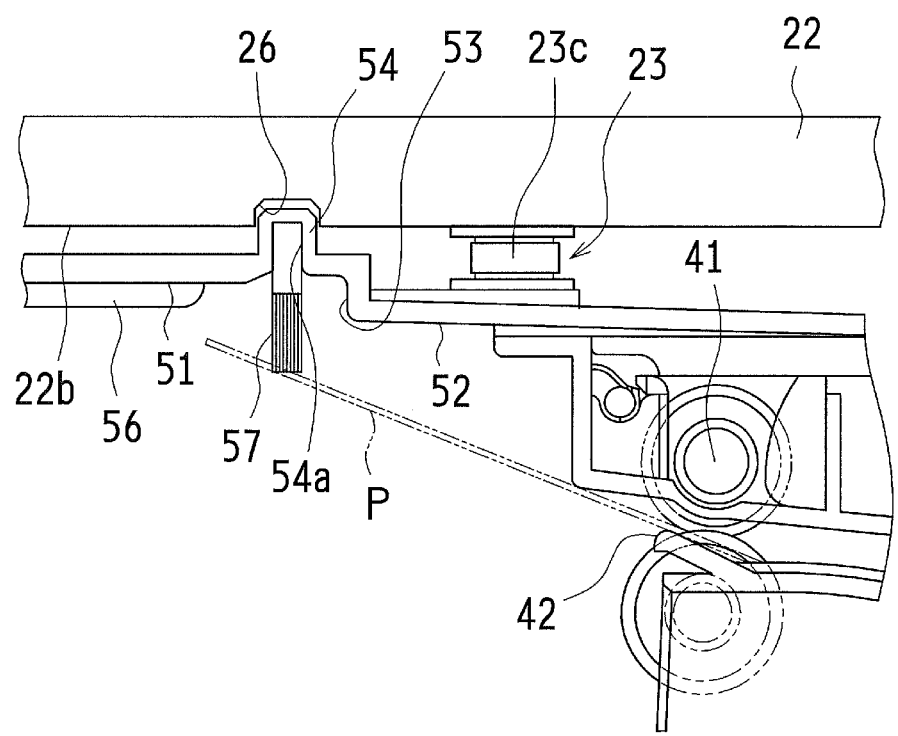
FIG. 8 is an enlarged cross-sectional view of a main part illustrating an application example of the image forming apparatus of the present invention.

In this embodiment, a concaved groove portion 54a is disposed at the bottom surface side of the projection 54. The concaved groove portion 54a is concaved upward at the first surface 51 side along the sub-scanning direction X. As illustrated in FIG. 8, using this concaved groove portion 54a, a static eliminating brush 57 may be disposed at the concaved groove portion 54a. In this case, the paper sheet discharge port 42 and the discharge roller pair 41 are preferred to be disposed near the stepped portion 53 (namely, close to the stepped portion 53). In order that the paper sheet P discharged from the paper sheet discharge port 42 is reliably in contact with the static eliminating brush 57 and then is placed on the discharge tray 40, a distance from the concaved groove portion 54a to the paper sheet discharge port 42 and the discharging direction of the paper sheet P from the paper sheet discharge port 42 may be designed in advance. With this configuration, disposing the static eliminating brush 57 at the concaved groove portion 54a allows reliably eliminating static electricity on the paper sheet discharged from the paper sheet discharge port 42.

Figure 9:
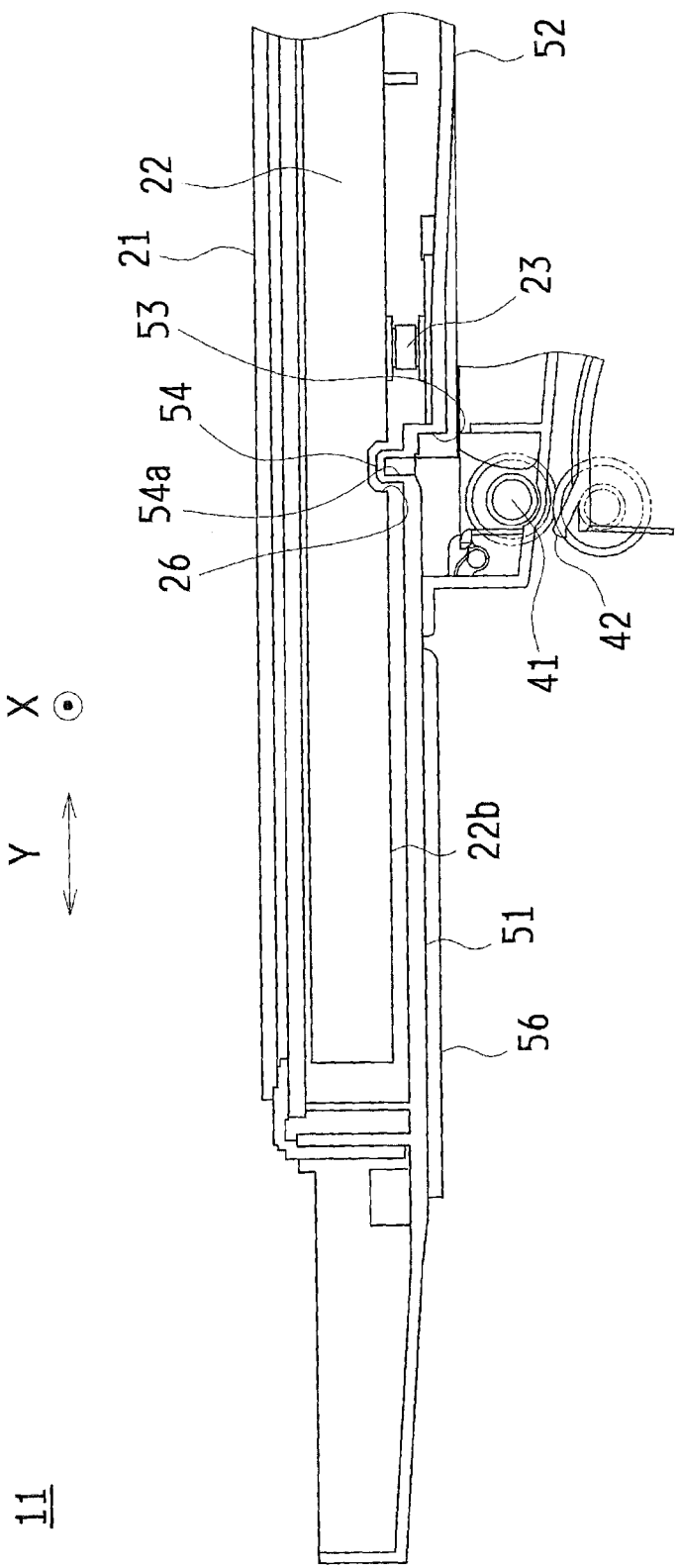
FIG. 9 is an enlarged cross-sectional view of a main part illustrating another exemplary constitution of an arranged location of a paper sheet discharge port (a discharge roller pair).

In the above-described embodiment, the paper sheet discharge port 42 (namely, the discharge roller pair 41) is arranged at the lower side of the second surface 52 near the stepped portion 53. However, as illustrated in FIG. 9, the paper sheet discharge port 42 (namely, the discharge roller pair 41) can be arranged at the lower side of the first surface 51 near the stepped portion 53.

Furthermore, in the above-described embodiment, disposing the stepped portion 53 provides a difference in height with respect to the discharge tray 40 between the first surface 51 and the second surface 52. However, without such stepped portion, forming the first surface 51 and the second surface 52 into an continuous inclined surface allows configuring the surface at the front side of the discharge tray 40 in the discharging direction as the first surface higher than the discharge tray 40 and the surface at the rear side of the discharge tray 40 in the discharging direction as the second surface lower than the first surface with respect to the discharge tray 40. The inclination angle with respect to the discharge tray 40 may be the same from the first surface to the second surface. The inclination angle of the first surface relative to the discharge tray 40 may be formed large, and the inclination angle of the second surface relative to the discharge tray 40 may be formed small (that is, the bottom surface 50 is bent at a boundary part between the first surface and the second surface).

The above-disclosed embodiments are to all intents and purposes merely illustrative and should not be construed as limiting. The scope of the present invention is defined by the claims and is not in any way restricted by the descriptions of the specification. Furthermore, all variations within the meaning and range of equivalency of the claims fall within the scope of the present invention.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Japanese Patent Application No. 2012-093122 filed in Japan on Apr. 16, 2012, the entire content of which is incorporated herein by reference.

INDUSTRIAL APPLICABILITY

The present invention is effective to an image forming apparatus with an in-body paper discharge structure. The present invention can be employed for an application where expanding a sheet discharge space is indispensable such that a paper sheet discharged on a discharge tray is easily extracted.

DESCRIPTION OF REFERENCE SIGNS

A image forming apparatus
1 exposure unit
2 developing unit
3 photosensitive drum
4 cleaning unit
5 charging unit
6 intermediate transfer belt unit
7 fixing unit
8 toner cartridge unit
10 apparatus main body
11 image capturing housing unit (housing of image reading unit)
11a sidewall
11b slit portion
12 image forming housing unit (housing of image forming unit)
13 in-body paper discharge space portion
13a back surface
14 conveyance roller pair
15 prior-to-registration roller pair
16 registration roller pair
20 image forming unit
21 document placement table glass
22 scanning body
22a back surface
22b bottom surface
23 pulling member
24 movable wiring cable (movable wiring)
24a folded-back distal end portion
26 guided portion (concaved groove portion)
30 paper sheet conveyance system
31 paper feed tray
32 paper feeder
32a separation conveyance roller
32b separating member
33 feed roller
34 rotating plate
35 elevating mechanism unit
40 discharge tray
41 discharge roller pair
42 paper sheet discharge port (discharge unit)
50 bottom surface (bottom surface of image capturing housing unit)
51 first surface
52 second surface
53 stepped portion
54 projection
54a concaved groove portion
56 rib piece
57 static eliminating brush
61 intermediate transfer belt
62 intermediate transfer belt drive roller
63 intermediate transfer belt driven roller
64 intermediate transfer roller
65 intermediate transfer belt cleaning unit
66 transfer roller
71 hot roller
72 pressure roller
P paper sheet
S paper sheet conveyance passage
Sr front-back reverse path X sub-scanning direction
Y paper discharging direction

The invention claimed is:

1. An image forming apparatus, comprising:
an image reading section configured to read a document placed on a document placement table by moving and scanning of a scanning body in a sub-scanning direction; and
an image forming section configured to form an image read by the image reading section on a paper sheet; wherein:
an in-body paper discharge space is formed between the image reading section and the image forming section and opens to a front surface side of an apparatus main body, and
a discharge section configured to discharge the paper sheet on which an image is formed by the image forming section; and
a discharge tray situated in the in-body paper discharge space and on which the paper sheet from the discharge section is to be placed, the discharge tray comprising wall surfaces at both sides of the discharge tray;
a bottom surface of the image reading section at a front surface side of the image forming apparatus in the in-body paper discharge space includes a plurality of ribs extending in a paper discharging direction;
the plurality of ribs are formed at different intervals.

2. The image forming apparatus according to claim 1, wherein
the discharge section discharges the paper sheet from a back surface side to the front surface side of the apparatus main body.

3. The image forming apparatus according to claim 1, wherein
a lower surface at the front surface side of the apparatus main body of the image reading section is formed to an inclined surface.

4. The image forming apparatus according to claim 1, wherein the paper discharging direction is perpendicular to the sub-scanning direction.

5. The image forming apparatus according to claim 1, wherein
the discharge tray comprises a flat surface without a projection.

6. The image forming apparatus according to claim 5, wherein
the wall surfaces formed at both sides of the discharge tray extend from the discharge section to the front surface side of the image forming apparatus.

7. The image forming apparatus according to claim 1, wherein
the plurality of ribs extend to the front side of the discharge section in the discharging direction.

* * * * *